United States Patent [19]

Roche et al.

[11] Patent Number: 4,830,894

[45] Date of Patent: May 16, 1989

[54] USE OF A PASTE CONTAINING PRECIOUS METALS FOR THE PRODUCTION OF BROWNING DISHES FOR MICROWAVE OVENS

[76] Inventors: Guy Roche, Chemin de Gigondas; Gerard Labregere, 6 rue Jean Rebier, both of, 87170 Isle, France

[21] Appl. No.: 126,096

[22] Filed: Nov. 30, 1987

[30] Foreign Application Priority Data

Jun. 10, 1987 [EP] European Pat. Off. ........ 87108366.3

[51] Int. Cl.$^4$ .......................... F24H 1/18; A47J 27/21; H05B 3/18
[52] U.S. Cl. ..................................... 428/34.5; 252/518
[58] Field of Search ............................. 501/17, 32, 20; 252/518; 428/35

[56] References Cited

U.S. PATENT DOCUMENTS 4,603,007  7/1986  Shibata et al. .................. 252/250 X

FOREIGN PATENT DOCUMENTS 125823    9/1980  Japan .
57-14141  1/1982  Japan .
1282899   9/1968  United Kingdom .

Primary Examiner—Nancy A. B. Swisher
Attorney, Agent, or Firm—Beveridge, DeGrandi & Weilacher

[57] ABSTRACT

Metal coatings for browning dishes to be used in microwave ovens are obtained by use of plastes of:
(a) 50 to 80% by weight of a mixture of
  (aa) 5 to 70% by weight of a conductive component formed of 5 to 95% by weight ruthenium oxide, and the balance being at least one of silver, palladium, rhodium oxide and/or bismuth oxide,
  (bb) 30 to 95% by weight of a glass frit
(b) 20 to 50% by weight of an organic binder.

Coatings which are applied to glass, ceramic and/or vitreous ceramic dishes and cooking vessels are very adherent and in a few minutes reach temperatures of up to 300° C.

4 Claims, No Drawings

USE OF A PASTE CONTAINING PRECIOUS METALS FOR THE PRODUCTION OF BROWNING DISHES FOR MICROWAVE OVENS

INTRODUCTION OF THE INVENTION

The invention relates to the use of paste containing precious metals, which are known in the field of microelectronics, for the production of metal and/or metal alloy coatings on browning dishes of glass, ceramic or vitreous ceramic for use in microwave ovens.

Foods are cooked and prepared in microwave ovens in such a manner that the microwaves penetrate from all sides into the food and the molecules are placed in oscillation (heat vibrations). Thus, only materials which are capable of allowing the passage of microwaves can be used as cooking and preparing dishes because they neither absorb nor reflect. Generally speaking, therefore, only glass, ceramic, vitreous ceramic, plastics and paper may be used. Traditional metal saucepans reflect the microwave energy and thus prevent the cooking and preparing of the foods contained therein.

With cooking and preparing in the microwave oven, the surface condition of the food remains unchanged. Browning dishes must therefore be used to produce a browned crust. The bottom of this dish of glass, ceramic or vitreous ceramic is preferably provided with a special metal alloy which absorbs the microwave energy and thus becomes hot in the microwave oven. As a result of this additional heating, the food then becomes crisp and browned.

The metal coatings for browning dishes used up until the present invention have the drawback that they continue to reflect a considerable portion of the microwave energy and therefore do not convert it into heat energy.

Moreover, these metal coatings known in the past suffer poor adherence to dishes, since the heat expansion coefficients of the metals or alloys which are used and the base plate or support which is of glass, ceramic or vitreous ceramic differ greatly.

SUMMARY OF THE INVENTION

Therefore, it is an object of the present invention to provide a metal plate or metal alloy coating for the base plates made of glass, ceramic and/or vitreous ceramic, which absorbs the microwave energy of microwave ovens as completely as possible and wherein the heat expansion coefficient can be matched to the support or base plate.

In achieving the above and other objects, one feature of the invention reside in using a paste comprising a sufficient amount of an electrically conductive component that includes ruthenium oxide as an essential ingredient and the balance silver, palladium, rhodium oxide and/or bismuth oxide. The paste further contains a sufficient amount of a glass frit and an organic binder.

Another feature of the invention resides in providing a process for coating cooking vessels of all convenient types for microwave usage with a coating formed of a precious metal paste as described herein.

A still further feature of the present invention resides in cooking dishes and vessels coated with metal coatings formed from the precious metal paste as described herein.

DETAILED DESCRIPTION OF THE INVENTION

In further detail, a feature of the invention resides in the use of pastes containing precious metals, comprising:
 (a) 50 to 80% by weight of a mixture of:
  (aa) 5 to 70% by weight of an electrically conductive component of 5 to 95% ruthenium oxide, and the balance being at least one of silver, palladium, rhodium oxide and/or bismuth oxide,
  (bb) and 30 to 95% by weight of a glass frit
 (b) 20 to 50% by weight of an organic binder.

A mixture of 5 to 95% ruthenium oxide is preferably used as the electrically conductive component and at least one of 0-60% by weight silver, 0 to 30% by weight palladium or silver-palladium, 0 to 10% by weight rhodium oxide and/or 0 to 10% by weight bismuth oxide as the remainder. These selected additives determine the electrical resistance of the coating and the absorption capacity for the microwave.

Also, for this purpose, certain glass frits have been tested and approved, which have the following composition in the form of a Seeger formula:

| $Li_2O$ | 0.2 to 0.7 | $Cr_2O_3$ | 0 to 0.1 |
| --- | --- | --- | --- |
| $Na_2O$ | 0. to 0.2 | $B_2O_3$ | 0.5 to 1 |
| MgO | 0 to 0.3 | $SiO_2$ | 1 to 4 |
| CaO | 0 to 0.4 | $TiO_2$ | 0 to 0.2 |
| ZnO | 0.1 to 0.75 | $ZrO_2$ | 0 to 0.2 |
| BaO | 0 to 0.2 | $SnO_2$ | 0 to 0.3 |
| $Al_2O_3$ | 0.1 to 0.7 | $F_2$ | 0. to 0.3 |

However, it is also possible to use a glass frit which contains lead with the following Seeger formula:

| $Li_2O$ | 0 to 0.5 | $B_2O_3$ | 0.2 to 0.7 |
| --- | --- | --- | --- |
| $Na_2O$ | 0 to 0.5 | $SiO_2$ | 1 to 3 |
| ZnO | 0 to 0.1 | $TiO_2$ | 0 to 0.1 |
| CdO | 0 to 0.1 | $ZrO_2$ | 0 to 0.1 |
| PbO | 0.5 to 1 | $F_2$ | 0 to 0.3 |
| $Al_2O_3$ | 0 to 0.3 | | |

The pastes are spread on to the cooking vessels and dishes by means known in this technology, such as by screen printing, decals or by means of brush on the base plate (the dish) and are fired from 700° to 1300° C.

Such pastes containing precious metals are generally known in microelectronics, wherein they serve for the production of electric resistance coatings.

Until the present invention, applicants are not aware that such pastes have been used for the production of metal coatings for absorbing microwaves from microwave ovens.

The glass frits are selected so that together with the base plates or dishes of glass, ceramic and vitreous ceramic they have optimum conformity in relation to the heat expansion coefficients between 20° and 300° C.

The organic binders serve to produce a paste from the glass frits and the components of the electrically conductive components. Known binders are for instance ethyl cellulose, certain cellulose derivatives, natural or synthetic resins, dissolved in a suitable, inert volatile solvent. These binder compositions are conventional in the art.

The metal and/or alloy coatings produced by these pastes containing precious metals surprisingly show very high absorption capacity for the microwaves of a microwave oven, so that a microwave dish which is thus coated reaches the temperature of 300° C. in a relatively short time and leads to a rapid browning of the food.

The following examples are presented to further illustrate and explain the use of pastes containing precious metals according to the invention:

EXAMPLE 1

25% by weight of a powdered mixture of 80% by weight $RuO_2$, 15% by weight of $Bi_2O_3$ and 5% by weight of $Rh_2O_3$ is mixed thoroughly with 75% by weight of a glass frit of the following composition (Seeger formula):

| | | | |
|---|---|---|---|
| $Li_2O$ | 0.50 | $Cr_2O_3$ | 0.005 |
| $Na_2O$ | 0.04 | $B_2O_3$ | 0.9 |
| $MgO$ | 0.05 | $SiO_2$ | 2.55 |
| $CaO$ | 0.02 | $TiO_2$ | 0.05 |
| $ZnO$ | 0.40 | $ZrO_2$ | 0.05 |
| $BaO$ | 0.10 | $SnO_2$ | 0.05 |
| $Al_2O_3$ | 0.25 | $F_2$ | 0.2 |

65% by weight of this mixture was made into a paste with 35% by weight of a solution of 3% ethyl cellulose in pine oil and is applied by means of the known decal technology to the bottom of a ceramic dish. After drying, it was heated for 12 hours at 750° C.

The ceramic dish which has been metal coated in such a manner reaches a temperature of 260° C. in 5 minutes in a microwave oven.

EXAMPLE 2

20% by weight of a powdered mixture of 90% by weight $RuO_2$ and 10% by weight $Bi_2O_3$ was mixed thoroughly with 80% by weight of a glass frit of the following composition (Seeger formula):

| | | | | | |
|---|---|---|---|---|---|
| $Li_2O$ | 0.50 | $CaO$ | 0.10 | $ZrO_2$ | 0.10 |
| $Na_2O$ | 0.01 | $B_2O_3$ | 0.70 | $TiO_2$ | 0.10 |
| $ZnO$ | 0.60 | $SiO_2$ | 3.50 | $SnO_2$ | 0.25 |
| $MgO$ | 0.10 | $Al_2O_3$ | 0.55 | $F_2$ | 0.20 |
| $BaO$ | 0.01 | | | | |

65% by weight of this mixture was made into a paste with 35% by weight of a solution of 20% methyl methacrylate in mineral varnish and applied to a porcelain plate by screen printing technology using a screen of 77 mesh/cm.

The firing occurred at 1250° C. for a period of one hour.

This plate reaches a temperature of 200° C. within 5 minutes in a microwave oven.

EXAMPLE 3

25% by weight of a powdered mixture of 90% by weight $RuO_2$ and 10% by weight $Bi_2O_3$ is mixed thoroughly with 75% by weight of a glass frit of the following composition (Seeger formula):

| | | | | | |
|---|---|---|---|---|---|
| $Na_2O$ | 0.05 | $PbO$ | 0.75 | $TiO_2$ | 0.04 |
| $Li_2O$ | 0.30 | $Al_2O_3$ | 0.20 | $ZrO_2$ | 0.09 |
| $ZnO$ | 0.05 | $B_2O_3$ | 0.48 | $F_2$ | 0.20 |
| $CdO$ | 0.07 | $SiO_2$ | 2.00 | | |

The paste which is produced analogously to that of Example 1 is applied to a porcelain plate and is fired at 800° C. for 6 hours. This plate reaches a temperature of 230° C. in 5 minutes in a microwave oven.

EXAMPLE 4

25% by weight of a powdered mixture of 90% $RuO_2$, 5% by weight $Bi_2O_3$ and 5% by weight silver is mixed with 75% by weight of a glass frit of the following composition (Seeger formula):

| | | | | | |
|---|---|---|---|---|---|
| $Li_2O$ | 0.50 | $B_2O_3$ | 0.80 | $ZrO_2$ | 0.07 |
| $Na_2O$ | 0.01 | $SiO_2$ | 3.05 | $TiO_2$ | 0.05 |
| $ZnO$ | 0.41 | $Al_2O_3$ | 0.35 | $SnO_2$ | 0.15 |
| $MgO$ | 0.05 | $Cr_2O_3$ | 0.05 | $F_2$ | 0.20 |
| $CaO$ | 0.05 | | | | |

With a 3% ethyl cellulose solution, a paste is produced which can be used for screen printing and is applied to a dish of vitreous ceramic. The firing occurs at 800° C. for 5 hours. The dish which is metal coated in this manner reaches a temperature of from 280° to 300° C. within 5 minutes in a microwave oven.

The binder vehicles for the precious metal pastes are conventional in silk screen and similar techniques for decoration of various surfaces. All types of cooking vessels and dishes, plates and the like can be coated in accordance with the present invention.

The paste can be coated on the inside bottom of a cooking vessel or dish, preferably however, the paste is coated on the outside bottom surface away from contact with the food.

The conductive cmmponents of the above examples are preferably produced by common precipitation with subsequent heating to 400° C. and mechanical comminution. The glass frit is produced preferably by melting together of the components, quenching of the glass flux and mechanical comminuting.

Further variations and modifications of the foregoing invention will be apparent to those skilled in the art from a reading thereof and are intended to be encompassed by the claims appended hereto.

EPO priority application No. 87 108 633.3 is relied on and incorporated by reference.

We claim:

1. A browning vessel having a bottom surface, at least a portion of said bottom surface having adhered thereon as the sole coating a coating produced from a paste composition comprising:
   (a) 50 to 80% by weight of a mixture of
      (aa) 5 to 70% by weight of a conductive component formed of 5 to 95% by weight ruthenium oxide, and the balance being at least one of silver, palladium, rhodium oxide and/or bismuth oxide and mixtures thereof,
      (bb) 30 to 95% by weight of a glass frit
   (b) 20 to 50% by weight of an organic binder whereby said browning vessel functions to absorb microwave energy in a microwave oven so that the browning dish reaches a temperature of 300° in a relatively short time and leads a rapid browning of the food that is placed therein.

2. The browning vessel as in claim 1, in which the paste compositon contains a conductive component of 50 to 95% by weight ruthenium oxide, and at least one of 0 to 60% by weight silver, 0 to 30% by weight palladium and/or silver-palladium 0 to 10% by weight rhodium oxide and/or 0 to 10% by weight bismuth oxide as the remainder.

3. The browning vessel as in claim 1, wherei the glass frit has the following composition (Seeger formula):

| | | | | | |
|---|---|---|---|---|---|
| $Li_2O$ | 0.2 to 0.7 | ZnO | 0.1 to 0.75 | $TiO_2$ | 0 to 0.2 |
| $Na_2O$ | 0 to 0.2 | $Al_2O_3$ | 0.1 to 0.7 | $ZrO_2$ | 0 to 0.2 |
| MgO | 0 to 0.3 | $Cr_2O_3$ | 0 to 0.1 | $SnO_2$ | 0 to 0.3 |
| CaO | 0 to 0.4 | $B_2O_3$ | 0.5 to 1 | $F_2$ | 0 to 0.3 |

4. A method of making a browning vessel for use in microwave cooking comprising coating at least part of the surface of a cooking vessel with a paste composition comprising
  (a) 50 to 80% by weight of a mixture of
    (aa) 5 to 70% by weight of a conductive component formed of 5 to 95% by weight ruthenium oxide, and the balance being at least one of silver, palladium, rhodium oxide and/or bismuth oxide and mixtures thereof,
    (bb) 30 to 95% by weight of a glass frit
  (b) 20 to 50% by weight of an organic binder and firing the coated vessel at a suitable temperature to form an adhered coating.

* * * * *